(12) United States Patent
Thota et al.

(10) Patent No.: US 12,164,409 B1
(45) Date of Patent: Dec. 10, 2024

(54) MACHINE LEARNING SYSTEMS AND METHODS TO CORROBORATE AND FORECAST USER EXPERIENCE ISSUES ON WEB OR MOBILE APPLICATIONS UTILIZING USER VERBATIM, MACHINE LOGS AND USER INTERFACE INTERACTION ANALYTICS

(71) Applicant: CITICORP CREDIT SERVICES, INC. (USA), Sioux Falls, SD (US)

(72) Inventors: Rajendra Kishore Thota, Frisco, TX (US); Anirban Dhar Chowdhury, Allen, TX (US); Keerthivasan Rajagopalan, Irving, TX (US); Bhanuprakash Reddy Nalamadgu, Richardson, TX (US); Ashutosh Sureka, Coppell, TX (US); Shadman Zafar, Plano, TX (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 461 days.

(21) Appl. No.: 16/685,869

(22) Filed: Nov. 15, 2019

(51) Int. Cl.
  *G06F 11/34* (2006.01)
  *G06F 18/24* (2023.01)
  *G06N 20/00* (2019.01)
  *G06Q 30/016* (2023.01)
  *H04L 41/5074* (2022.01)

(52) U.S. Cl.
  CPC ...... *G06F 11/3438* (2013.01); *G06F 11/3476* (2013.01); *G06F 18/24* (2023.01); *G06N 20/00* (2019.01); *G06Q 30/016* (2013.01); *H04L 41/5074* (2013.01)

(58) Field of Classification Search
  CPC . G06F 11/3438; G06F 11/3476; G06N 20/00; G06K 9/6267; H04L 41/5074
  USPC ....................................................... 705/304
  See application file for complete search history.

(56) References Cited

U.S. PATENT DOCUMENTS

| | | | |
|---|---|---|---|
| 8,724,795 B1 * | 5/2014 | Aldrich | H04M 3/51 379/265.02 |
| 10,754,883 B1 * | 8/2020 | Kannu | G06F 16/36 |
| 10,803,399 B1 * | 10/2020 | Cohen | G06F 16/93 |

(Continued)

OTHER PUBLICATIONS

Zheng Zhao et al., "Spectral Feature Selection for Supervised and Unsupervised Learning", ICML '07: Proceedings of the 24th international conference on Machine learning, Jun. 2007, pp. 1151-1157 (Year: 2007).*

*Primary Examiner* — Sangeeta Bahl
*Assistant Examiner* — Joshua D Schneider
(74) *Attorney, Agent, or Firm* — Perkins Coie LLP

(57) ABSTRACT

Systems and methods for data corroboration and forecasting in which a sever generates structured customer feedback data from unstructured customer verbatim data and uses unsupervised machine learning modeling techniques to identify similar word clusters within the structured customer feedback data, classifies the identified word clusters into multiple categories of customer issues, and detects one or more trending customer issues within the multiple categories. The server may also retrieve web/mobile application usage analytics data and system logs data and use unsupervised machine learning modeling techniques to corroborate customer web/mobile navigation and service issues associated with the structured customer feedback data.

20 Claims, 5 Drawing Sheets

(56) References Cited

U.S. PATENT DOCUMENTS

| | | |
|---|---|---|
| 11,057,409 B1* | 7/2021 | Bisht .................. H04L 41/12 |
| 2005/0060217 A1* | 3/2005 | Douglas ................ G06Q 10/06 705/7.14 |
| 2010/0325107 A1* | 12/2010 | Kenton ................ G06Q 30/00 707/723 |
| 2012/0042318 A1* | 2/2012 | Doan .............. G06Q 10/06315 718/103 |
| 2012/0130771 A1* | 5/2012 | Kannan ............. G06Q 30/0203 707/738 |
| 2014/0358608 A1* | 12/2014 | Bianchi ......... G06Q 10/063114 705/7.15 |
| 2015/0120383 A1* | 4/2015 | Bennah ............ G06Q 30/0202 705/7.31 |
| 2017/0242919 A1* | 8/2017 | Chandramouli .... G06F 16/3344 |
| 2017/0364402 A1* | 12/2017 | Chua .................... G06F 11/076 |
| 2018/0108022 A1* | 4/2018 | Bandera .......... G06Q 10/06316 |
| 2018/0191867 A1* | 7/2018 | Siebel ..................... G06F 8/35 |
| 2019/0220695 A1* | 7/2019 | Nefedov ................ G06N 5/022 |
| 2019/0268214 A1* | 8/2019 | Maes ..................... G06F 18/24 |
| 2020/0311738 A1* | 10/2020 | Gupta .............. G06F 16/24578 |
| 2020/0380074 A1* | 12/2020 | Li ........................ G06F 16/285 |

\* cited by examiner

MACHINE LEARNING SYSTEMS AND METHODS TO CORROBORATE AND FORECAST USER EXPERIENCE ISSUES ON WEB OR MOBILE APPLICATIONS UTILIZING USER VERBATIM, MACHINE LOGS AND USER INTERFACE INTERACTION ANALYTICS

FIELD OF THE INVENTION

The present invention relates generally to systems and methods for data corroboration and forecasting, and more particularly to technological solutions implementing systems and methods for corroborating and forecasting customer's experience issues with mobile and web applications.

BACKGROUND OF THE INVENTION

Currently, manual systems exist in which observations may be made on various channels including, without limitation, customer feedback regarding mobile apps to app stores, website feedback mechanisms and customer complaints or grievances. In such systems, a manual process may be employed to collect those observations and place them into an issue box. In in such legacy systems, customer-reported problems may be manually identified with respect, for example, to a self-tagging experience that provides feedback and explains what the problem entails.

In such legacy systems, an exercise may also occur, for example, in which system application log tag outtakes may be examined manually to determine what each outtake entails, what the customer expects, and the customer's level of satisfaction. Further, in such legacy systems, customer application usage analytics may be employed to manually determine, for example, how one or more websites are being used and how they may be performing at load. Such observations may be manually collected to identify customer issues, such as out-of-box issues with apps from app stores and performance drop-outs on websites.

Other legacy products may provide extraction of words and/or phrases, such as bi-grams or tri-grams (i.e., sequences of two or three words) words over a period of time, such as a period of several weeks. Such products are typically based on word counts and basic filtering of common words. For example, such legacy products may extract words, such as "account", "app", or "payment", when found at a high level of occurrence and other words, such as "card", "pay", "time", "trying" or "work", when found at a lower level of occurrence. None of such legacy products provides a level of automated detection of upward or downward trending over complex n-grams (i.e., sequences of 2, 3, 4 . . . n number of words), but only provides extraction based on frequency of occurrence.

However, it is not feasible to manually collect tens of thousands of such occurrences of such observations and thereafter manually collate and prioritize such a massive collection of occurrences to create a single issue list in any reasonable period of time, much less in real time. There is a current need for systems and methods for corroborating and forecasting data, that address the problems of the above identified legacy manual mechanisms. The problem solved by embodiments of the invention is rooted in technological limitations of such legacy manual approaches. Improved techniques and, in particular, improved applications of technology are needed to address the problems of currently employed manual mechanisms. More specifically, the aforementioned legacy manual approaches fail to achieve the sought-after capabilities of the herein-disclosed techniques for data corroboration and forecasting systems and methods.

SUMMARY OF THE INVENTION

Embodiments of the invention advance the technical fields for addressing problems associated with the above described currently employed manual mechanisms, as well as advancing peripheral technical fields. Such embodiments are directed to technological solutions that may involve a system that includes, for example, a server having one or more processors coupled to memory, which one or more processors may be programmed, for example, to receive unstructured customer feedback data over a predefined period of time from a plurality of different customer feedback data sources; to generate, using machine learning natural language processing, structured customer feedback data from the unstructured customer feedback data received over the predefined period of time from the plurality of different customer feedback data sources; to identify, using unsupervised machine learning topic clustering modeling, clusters of semantically similar words within the structured customer feedback data; to classify, using unsupervised machine learning topic classification modeling, the clusters of semantically similar words into a plurality of categories of customer issues; and to detect, using unsupervised machine learning topic trending modeling, at least one trending customer issue within the plurality of categories of customer issues.

In an aspect according to embodiments of the invention, the unstructured customer feedback data may be, for example, website customer feedback data, app store customer feedback data, call center transcripts, and live support chat transcripts. In an additional aspect, the one or more processors may be further programmed, for example, to merge the structured customer feedback data generated from the unstructured customer feedback data received over the predefined period of time from the plurality of different customer feedback data sources. In another aspect, the clusters of semantically similar words identified within the structured customer feedback data may be, for example, clusters of similar customer issue-related words identified within the structured customer feedback data. In a further aspect, the classified plurality of categories of customer issues may be, for example, a plurality of categories of customer problem-related issues.

In an additional aspect according to embodiments of the invention, the one or more processors may be further programmed, for example, to retrieve usage analytics data associated with the structured customer feedback data and to detect, using unsupervised machine learning usage analytics data modeling, at least one occurrence of an anomalous customer issue within the structured customer feedback data. In a further aspect, the detected at least one occurrence of the anomalous customer issue may be, for example, at least one anomalous occurrence of a customer web/mobile navigation issue within the retrieved usage analytics data associated with the structured customer feedback data. In another aspect, the least one anomalous occurrence of the customer web/mobile navigation issue may be, for example, at least one anomalous occurrence of a customer web/mobile navigation flow pattern issue within the retrieved usage analytics data associated with the structured customer feedback data.

In a further aspect according to embodiments of the invention, the one or more processors may be further programmed, for example, to retrieve system usage logs data associated with the structured customer feedback data and to detect, using unsupervised machine learning system logs data modeling, at least one customer service issue within the system usage logs data associated with the structured customer feedback data.

In a still further aspect according to embodiments of the invention, the one or more processors may be further programmed, for example, to retrieve both usage analytics data and system usage logs data associated with the structured customer feedback data and to corroborate the detected at least one trending customer issue based upon cross-relating the detected at least one trending customer issue with at least one of the retrieved usage analytics data and the retrieved system usage logs data associated with the structured customer feedback data. In an additional aspect, the one or more processors may be further programmed, for example, to automatically prioritize the detected at least one trending customer issue over a plurality of other detected trending customer issues based on the corroboration of the detected at least one trending customer issue. In another aspect, the one or more processors may be further programmed, for example, to automatically generate a prioritized list of action items in a form of service tickets within a service tickets tracking system based on the prioritization.

In other aspects according to embodiments of the invention, the at least one trending customer issue detected within the plurality of categories of customer issues may be, for example, at least one customer problem-related issue detected within the plurality of categories of customer issues. In still other aspects, the at least one trending customer issue detected within the plurality of categories of customer issues may be, for example, at least one most frequently occurring customer issue detected within the plurality of categories of customer issues. In additional aspects, the at least one trending customer issue detected within the plurality of categories of customer issues may be, for example, at least one most frequently occurring customer issue associated with a most frequently employed customer usage feature detected within the plurality of categories of customer issues. In further aspects, the at least one trending customer issue detected within the plurality of categories of customer issues may be, for example, at least one customer issue detected within the plurality of categories of customer issues that exceeds an historic baseline for the at least one customer issue.

In an additional aspect according to embodiments of the invention, the one or more processors may be further programmed, for example, to log the detected at least one trending customer issue into a service ticketing system. In another aspect, the one or more processors may be further programmed, for example, to automatically track a status of the logged at least one trending customer issue. In a further aspect, the one or more processors may be programmed, for example, to receive status updates comprising examination and evaluation updates regarding resolution of the logged at least one trending customer issue. In a still further aspect, the one or more processors may be programmed, for example, to mark the logged at least one trending customer issue as closed when the logged at least one trending customer issue is resolved. In still another aspect, the one or more processors may be further programmed, for example, upon resolution of the detected at least one trending customer issue, to automatically retrieve data regarding identities of customers associated with the detected at least one trending customer issue and to generate messages notifying the customers associated with the detected at least one trending customer issue of resolution of the at least one trending customer issue.

Embodiments directed to the technological solutions described herein may also involve a method that may employ computer hardware and software, including, without limitation, one or more processors coupled to memory and non-transitory computer-readable storage media with one or more executable programs stored thereon which instruct the one or more processors to perform methods that may involve, for example, receiving, by a server having the one or more processors coupled to memory, unstructured customer feedback data over a predefined period of time from a plurality of different customer feedback data sources; generating, by the one or more processors of the server, using machine learning natural language processing, structured customer feedback data from the unstructured customer feedback data received over the predefined period of time from the plurality of different customer feedback data sources; identifying, by the one or more processors of the server, using unsupervised machine learning topic clustering modeling, clusters of semantically similar words within the structured customer feedback data; classifying, by the one or more processors of the server, using unsupervised machine learning topic classification modeling, the clusters of semantically similar words into a plurality of categories of customer issues; and detecting, by the one or more processors of the server, using unsupervised machine learning topic trending modeling, at least one trending customer issue within the plurality of categories of customer issues.

An aspect of the method according to embodiments of the invention may further involve, for example, retrieving, by the one or more processors of the server, usage analytics data associated with the structured customer feedback data; and detecting, by the one or more processors of the server, using unsupervised machine learning usage analytics data modeling, at least one occurrence of an anomalous customer issue within the structured customer feedback data. A further aspect may involve, for example, retrieving, by the one or more processors of the server, system usage logs data associated with the structured customer feedback data; and detecting, by the one or more processors of the server, using unsupervised machine learning system logs data modeling, at least one customer service issue within the system usage logs data associated with the structured customer feedback data. A still further aspect may involve, for example, retrieving, by the one or more processors of the server, both usage analytics data and system usage logs data associated with the structured customer feedback data; and corroborating, by the one or more processors of the server, the detected at least one trending customer issue based upon cross-relating the detected at least one trending customer issue with at least one of usage analytics data and the system usage logs data associated with the structured customer feedback data.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
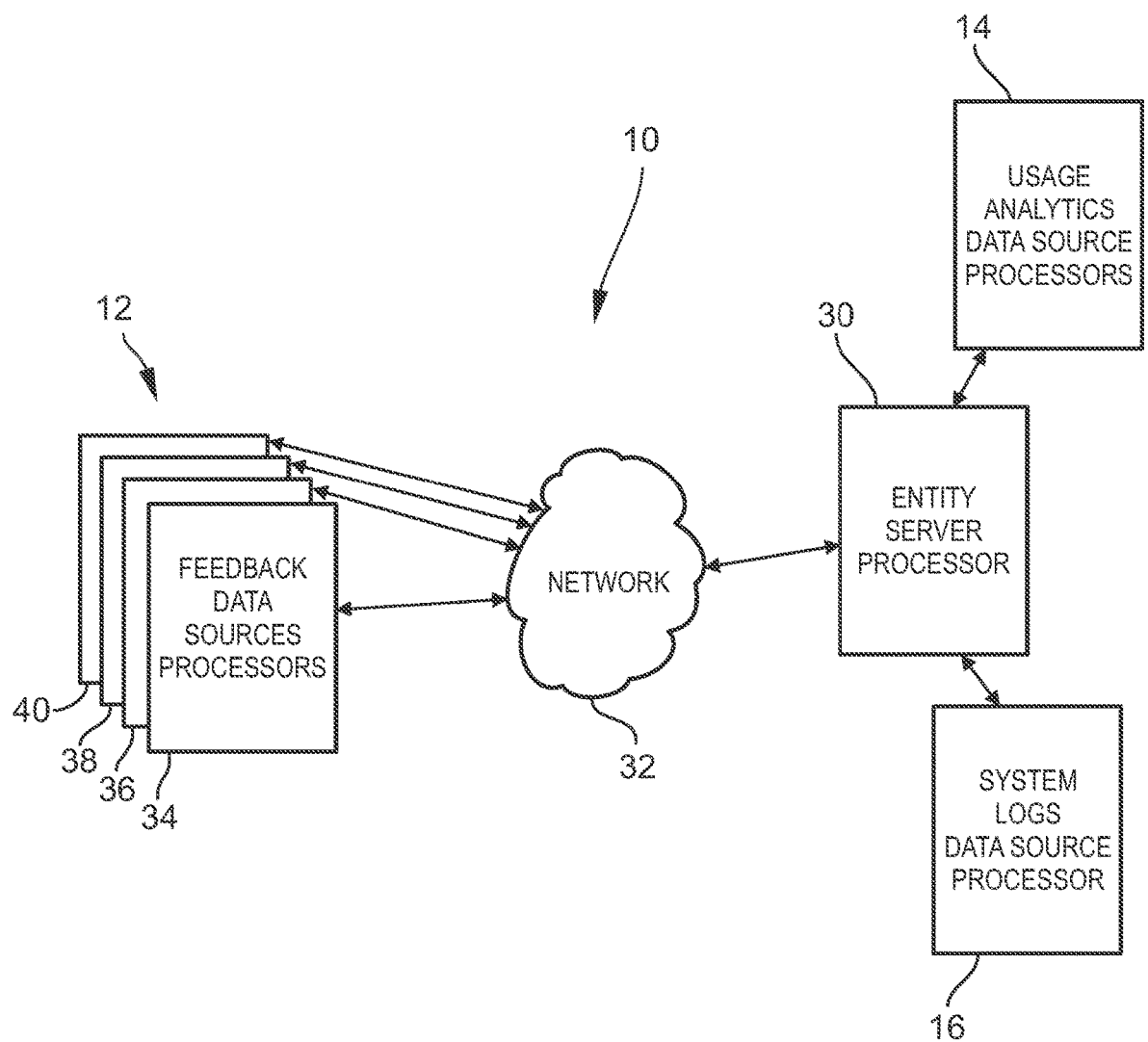
FIG. 1 is a schematic flow diagram that illustrates examples of components and flow of data between components for data corroboration and forecasting systems and methods according to embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention covers such modifications and variations that come within the scope of the invention.

Embodiments according to the invention may provide, for example, systems and methods for detecting trending topics including, without limitation, trending problem-related topics in communications, such as customer comments and voice call transcripts. According to embodiments of the invention, trending problem-related topics that are detected may be verified and/or corroborated, for example, by cross-relating with either or both of application usage analytics and system logs. In order to detect, verify and/or corroborate such trending topics, embodiments according to the invention may employ, for example, machine learning natural language understanding or processing (NLU or NLP), anomaly detection, and unsupervised clustering techniques to discover groups of similar examples within the data.

Such machine learning NLU or NLP may involve, for example, application of NLU or NLP algorithms and processing to discern the meaning of such communications. Anomaly detection according to embodiments of the invention may involve, for example, employing usage analytics to identify outliers or rare items, events, or observations. Unsupervised clustering techniques according to embodiments of the invention may involve, for example, techniques discovering groups of similar examples within the data.

Thus, embodiments according to the invention may build intelligence to identify, for example, patterns in application behavior via analytics and/or system logs that presage specific user experience issues prior to such issues becoming widespread. Once such patterns are identified, based on pre-defined thresholds, embodiments according to the invention may generate a metric-driven, prioritized list of action items in a form, for example, of automatically-generated service tickets within a system capable of tracking service tickets, which may be assigned to one or more appropriate team(s) which may be determined by an algorithm.

In embodiments according to the invention, trending problems may be determined and addressed based, for example, on customer feedback statements from different sources without a need for prepared training data sets used in training supervised models. Such trending problems may be prioritized based, for example, on verifiability from application usage analytics data and/or application system logs. Thus, according to embodiments of the invention, probable user experience issues may be predicted in advance based, for example, on usage analytics data and/or application system logs, and a systematic path to resolution and tracking may be determined, thereby reducing the steps between issue detection and resolution of the issues.

In embodiments according to the invention, machine learning topic modeling may be used, for example, in statistical modeling of customer complaint data to identify clusters of semantically similar words. Machine learning topic classification according to embodiments of the invention may be used, for example, in classifying topics in general categories. Machine learning topic trending according to embodiments of the invention may be used, for example, in identifying the most prevalent topics.

In embodiments according to the invention, more frequent occurrences of particular terms may be associated with more popular or more frequent usage features and or usage pathways. Embodiments according to the invention may provide a mechanism that, for example, detects those terms which may be spiking relative to an historic baseline. Thus, an anomaly detection aspect according to embodiments of the invention may compare forecasted values of observed terms and combine a result of such comparison with unsupervised topic and/or taxonomy construction.

Embodiments according to the invention do not require pre-training of algorithms. Further, embodiments according to the invention may optimize algorithmic trend predictions of each topic by fitting machine learning models to each topic individually and computing forecast and anomalies respectively. Thus, embodiments according to the invention may be dynamic and adaptive to a variation in the data, without requiring human intervention to perform a virtually impossible manual task of sifting through tens of thousands of topics detected, while detecting only a relatively small number of priority issues that may actually require attention. Further, embodiments according to the invention also avoid extensive manual data sanitation and/or labelling efforts.

Data corroboration and forecasting systems and methods according to embodiments of the invention provide solutions in a data rich and data intensive operation that may employ a machine learning-based approach not only to collect, collate, and corroborate customer issues data but also may use that information in real time, for example, to print out a customer issues solution, generate a customer issues ticket, generate a customer issues forecast, or generate a system warning at a time when a customer issue arises. The solutions provided according to embodiments of the invention may be based, for example, on using machine learning to assess particular problems and generate action items from very large volumes of machine-generated output and/or voluntarily provided output from various modes.

FIG. 1 is a schematic flow diagram that illustrates examples of components and flow of data between components for data corroboration and forecasting systems and methods according to embodiments of the invention. Referring to FIG. 1, a data corroboration and forecasting system 10 according to embodiments of the invention may employ unsupervised training, for example, in processing of data from various channels of data, such as customer feedback 12, usage analytics 14, and system logs 16. Such unsupervised training may be used to create models using machine learning mechanisms that are able to parse large volumes of machine generated output and/or voluntarily provided output data from various data sources 12, 14, and 16 to identify trends and anomalies within the data in a specific time frame and focus only on those issues that are significant.

Referring further to FIG. 1, data corroboration and forecasting system 10 according to embodiments of the invention may employ one or more processors of at least one server 30 coupled to the multiple data sources 12, 14, 16 directly or indirectly, for example, via a network 32. For example, sources of customer feedback 12 data may include, without limitation, website customer feedback data 34, app store customer feedback data 36, call center transcripts 38, and live chat transcripts 40. Other sources of data for embodiments of the invention may include, for example, usage analytics 14 and system logs 16 coupled directly or indirectly to the one or more processors of the at least one server 30.

Figure 2:
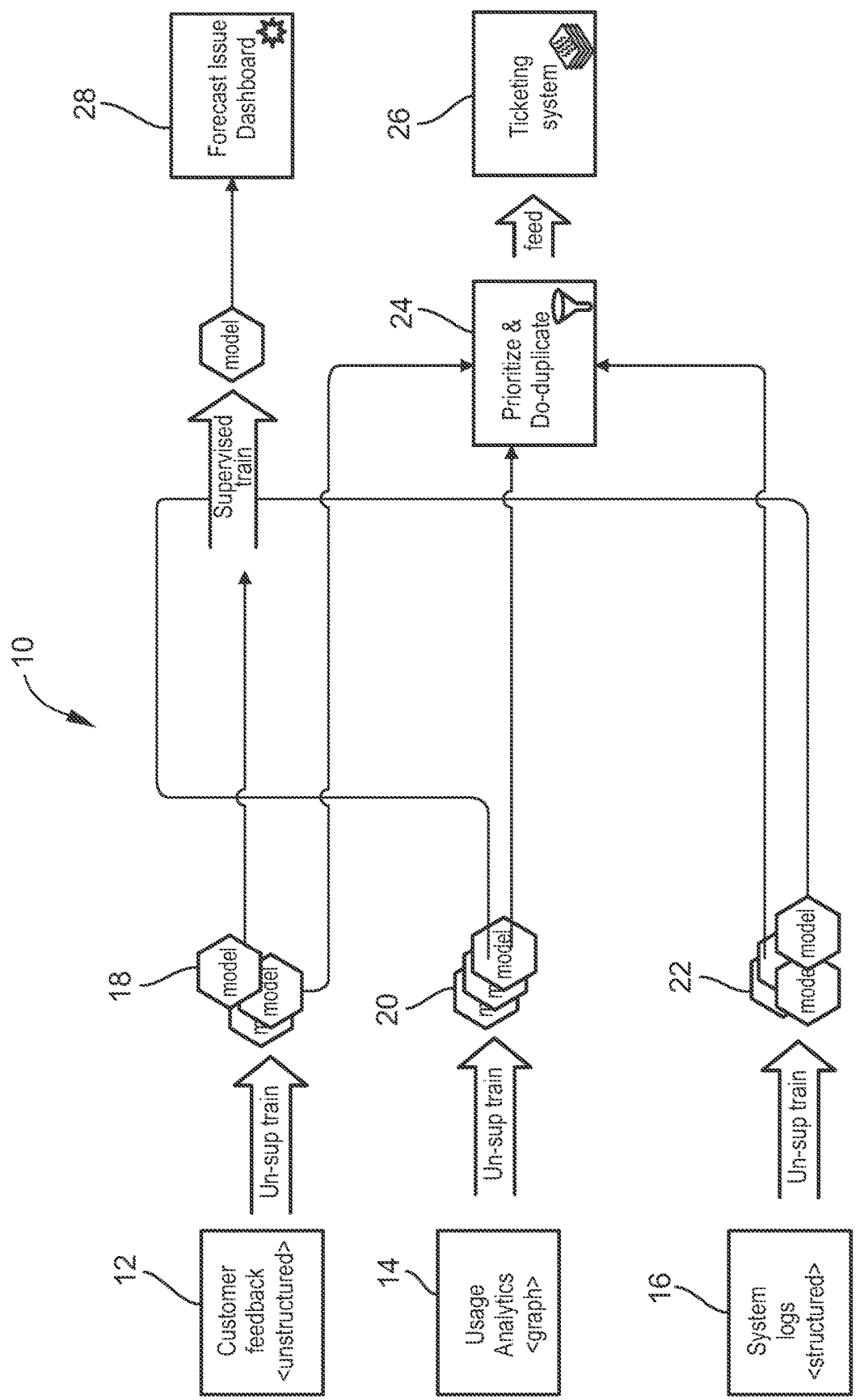
FIG. 2 is a schematic diagram that illustrates examples of data processing in data corroboration and forecasting systems and methods according to embodiments of the invention.

FIG. 2 is a schematic diagram that illustrates examples of data processing in data corroboration and forecasting system 10 according to embodiments of the invention. According to embodiments of the invention, the output data generated by each of these various modes 12, 14, and 16 may be different. For example, customer feedback data 12 may be unstructured, and embodiments of the invention may employ, for example, machine learning NLU or NLP for understanding the meaning of such unstructured customer feedback data. Usage analytics 14 may typically involve, for example, numerous digitally recorded measurements including, without limitation, numbers of web visitors and pages viewed, time stamps, and links clicked. System logs 16, which may be more structured, may include without limitation, timestamps, links or URLs, responses, performance metrics, and time.

Embodiments according to the invention may involve, for example, developing and employing machine learning models 18, 20, and 22 for processing data from each data source 12, 14, and 16. Customer feedback machine learning models 18 for processing customer feedback 12 may have specific tasks including, without limitation, extracting customer feedback, identifying trending topics, and determining whether or not particular trends may be anomalous. Usage analytics machine learning models 20 may be developed and employed, for example, for processing usage analytics data 14 to identify common patterns of navigation that appear in the data and determine whether identified common patterns may constitute, for example, normal flows or affected flows.

According to embodiments of the invention, affected flows may include, without limitation, a looping web/mobile application navigation flow, a web/mobile application navigation flow that drops off, a web/mobile application navigation flow that is abnormally slow, or web/mobile application navigation patterns that are executed at an abnormally slow pace. Thus, according to embodiments of the invention, the machine learning models 20 for processing usage analytics data may self-train, for example, to identify patterns of web/mobile application navigation including, without limitation, web/mobile application navigation patterns of a broken, extended, or looping nature. Machine learning algorithms according to embodiments of the invention may build mathematical models 18, 20, and 22 for processing the data from each data source 12, 14, and 16 relying on patterns and inferences without supervision.

With regard to customer feedback data 12, machine learning models 18 according to embodiments of the invention may include, without limitation aspects of topic modeling to identify clustering of semantically similar words, topic classification to classify categories of topics, and topic trending to identify prevalent topics. With regard to usage analytics data 14, other machine learning models 20 according to embodiments of the invention may include, without limitation, aspects of navigational themes and error reports to identify navigation issues. With regard to system logs 16, additional machine learning models 22 according to embodiments of the invention may include, without limitation, aspects of service availability and error reports to identify system issues.

In embodiments of the invention, still other machine learning models 24 may, for example, automatically sort the output of processing by machine learning models 18, 20, and 22 of data from each data source 12, 14, and 16 into patterns. Thus, such machine learning models 24 may further process the respective processing outputs of customer feedback machine learning models 18, usage analytics machine learning models 20, and system logs machine learning models 22 to identify, collate, prioritize, and deduplicate, for example, a list of a predetermined number of the most prevalent issues at particular times on particular dates. Such issues may be logged as tickets into a ticketing system 26, for example, for long term fixes, such as policy decisions or changes in technology or code.

According to embodiments of the invention, issues logged into the ticketing system 26 as tickets may result from a determination of trending problems from customer feedback processing 18 and prioritizing the trending problems based on verification from usage analytics data machine learning models 20 and/or system logs data machine learning models 22. Assume, for example, processing of customer feedback 12 by machine learning models 18 using machine learning NLU or NLP, anomaly detection, and unsupervised clustering techniques groups of similar examples detects examples within the data, such as "GO_PAPERLESS", as an issue that is trending upwardly. Assume further that processing of usage analytics data 14 by machine learning models 20 identifies the issue, "GO_PAPERLESS", as an outlier or a rare item, event, or observation. Assume also that processing of system logs data 16 by machine learning models 22 indicates, for example, the occurrence of service issues or error reports associated with the issue, "GO_PAPERLESS".

Thus, in embodiments of the invention, the issue, "GO_PAPERLESS" may then be logged as a ticket and placed into a queue into the ticketing system 26, for example, with other such issues for a long term fix. According to the ticketing system 26 aspect for embodiments of the invention, particular customer feedback 12 may correspond to and be collated with specific system usage analytics 14 and system logs 16, which may infer a certain user experience or customer impact for logging as a ticket in the ticketing system 26.

A forecast issue dashboard 28 aspect according to embodiments of the invention, may focus initially, for example, on usage analytics 14 and system logs 16 to identify and forecast potential issues prior to receiving significant customer feedback 12, which may be likely to commence at a later time. In embodiments of the invention, such forecast of potential issues may, for example, be displayed on the forecast dashboard 28 before receiving corresponding customer feedback 12, such as an advanced notification to a call center or alerting messages displayed on web/Mobile applications, to reduce the impact of such issues.

An output of data corroboration and forecasting system 10 according to embodiments of the invention may include, without limitation, an alert or forecast regarding a particular issue displayed on forecast dashboard 28. Another output of the data corroboration and forecasting system 10 according to embodiments of the invention may include, without limitation, a ticketing system 26 log for longer term issues, such as issues that may, for example, require a specific policy change or an engineering change on a longer term basis.

Once the various topics that are causing issues are identified and clustered into groups of similar issues using machine learning according to embodiments of the invention, data regarding such groups of issues may be captured and sent, for example, using a software development lifecycle (SDLC) program to one or more appropriate destinations for resolution. According to embodiments of the invention, a ticketing system 26 of the SLDC program may be employed to send that data and receive status updates, such as examination and evaluation updates, regarding resolution of the issues. In embodiments of the invention, such open issues may be automatically tracked, and periodically as such issues are resolved, those issues may be marked as resolved and closed.

Embodiments of the invention may be able to anticipate issues including, without limitation, system-side issues, memory issues, or central processing unit issues in order to address such issues in real time and may provide a shorter term fix. The shorter term fix aspect according to embodiments of the invention may be in addition to the longer term fix aspect.

Figure 3:
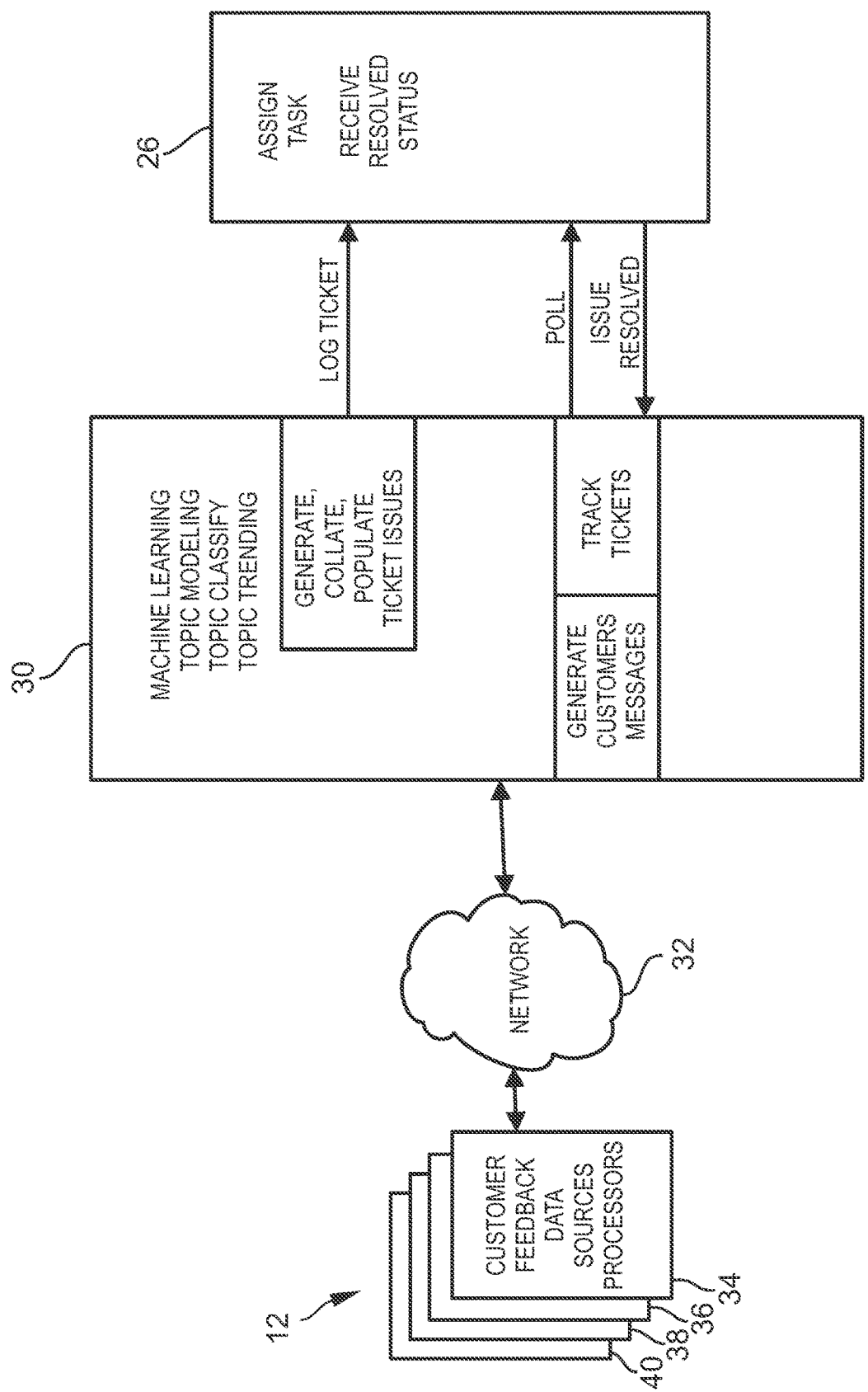
FIG. 3 is a schematic diagram that illustrates an example of a shorter term fix aspect of data corroboration and forecasting systems and methods according to embodiments of the invention.

FIG. 3 is a schematic diagram that illustrates an example of a shorter term fix aspect of data corroboration and forecasting systems and methods according to embodiments of the invention. Referring to FIGS. 2 and 3, embodiments of the invention may employ a sophisticated implementation of NLU or NLP to adapt to and merge data from various different customer feedback data sources 12 including, without limitation, website customer feedback data 34, app store customer feedback data 36, call center transcripts 38, and live support chat transcripts 40. In addition, embodiments according to the invention may connect to usage analytics logs 14 as well system logs 16 to find one or more matching patterns within the data, as well as a time-based dependency, for example, when there may be different operations.

Referring to FIG. 3, in such shorter term fix aspect according to embodiments of the invention, customer feedback data 12 may be received via network 32 by one or more processors of server 30. Such one or more processors of server 30 may employ the sophisticated implementation of NLU or NLP to adapt and merge data from the various different customer feedback data sources 12 including, without limitation, website customer feedback data 34, app store customer feedback data 36, call center transcripts 38, and live support chat transcripts 40 to identify trending topics. Embodiments according to the invention may employ such customer feedback data 12 exclusively to identify trending issues using NLU or NLP and log the identified issues into ticketing system 26 as longer term issues.

Figure 4:
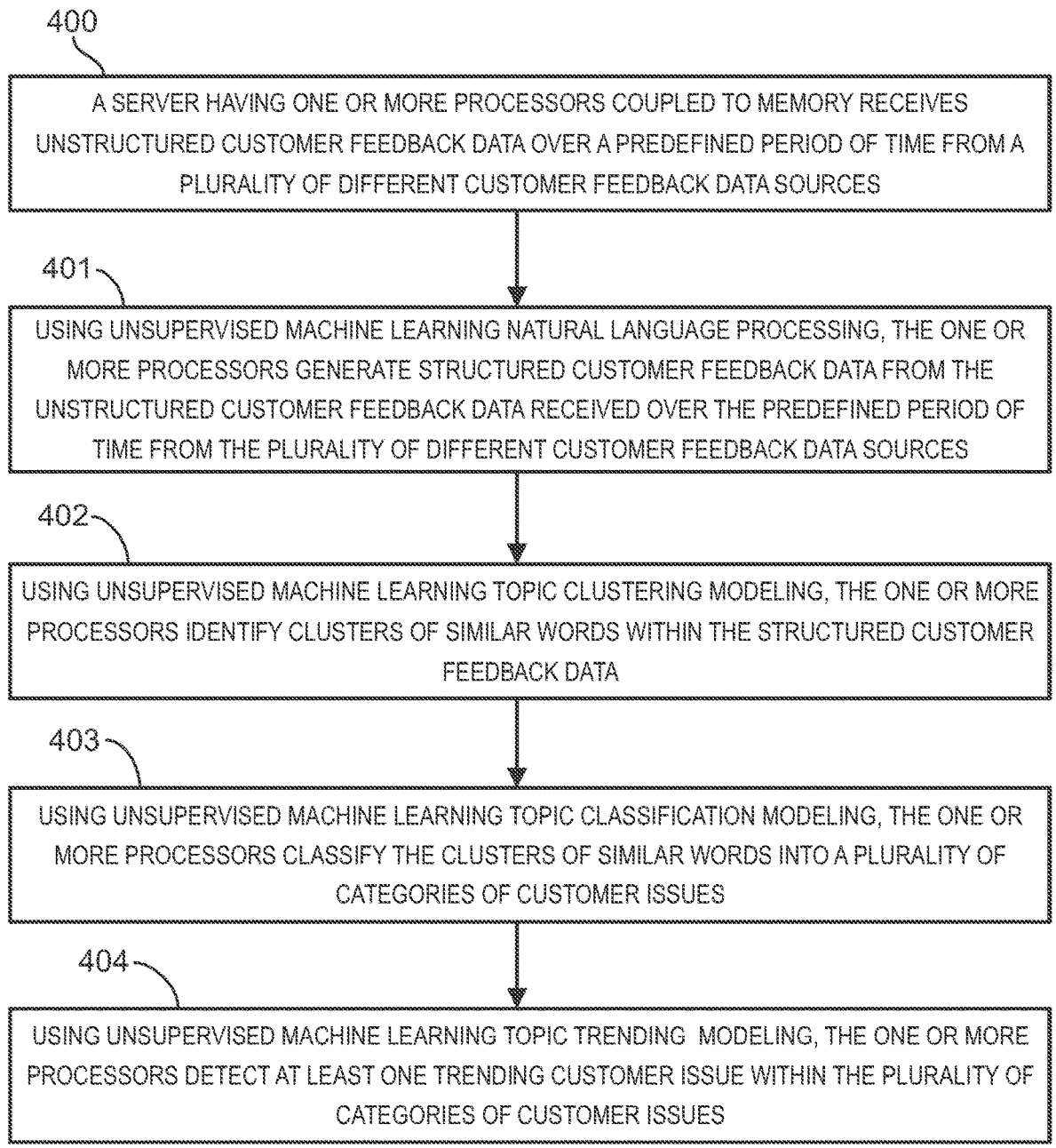
FIG. 4 is a flow chart that illustrates an example of a process of identifying trending customer issues based on customer feedback data according to embodiments of the invention.

FIG. 4 is a flow chart that illustrates an example of a process of identifying trending customer issues based on customer feedback data according to embodiments of the invention. Referring to FIGS. 1 and 4, at 400, a server 30 having one or more processors coupled to memory may, for example, receive unstructured customer feedback data over a predefined period of time from a plurality of different customer feedback data sources 12, and at 401, using unsupervised machine learning natural language processing, the one or more processors 30 may, for example, generate structured customer feedback data from the unstructured customer feedback data received over the predefined period of time from the plurality of different customer feedback data sources 12.

Referring further to FIG. 4, at 402, using unsupervised machine learning topic clustering modeling, the one or more processors may, for example, identify clusters of semantically similar words within the structured customer feedback data, and at 403, using unsupervised machine learning topic classification modeling, the one or more processors of the server 30 may, for example, classify the clusters of semantically similar words into a plurality of categories of customer issues. Thereafter, at 404, using unsupervised machine learning topic trending modeling, the one or more processors of the server 30 may, for example, detect at least one trending customer issue within the plurality of categories of customer issues.

Figure 5:
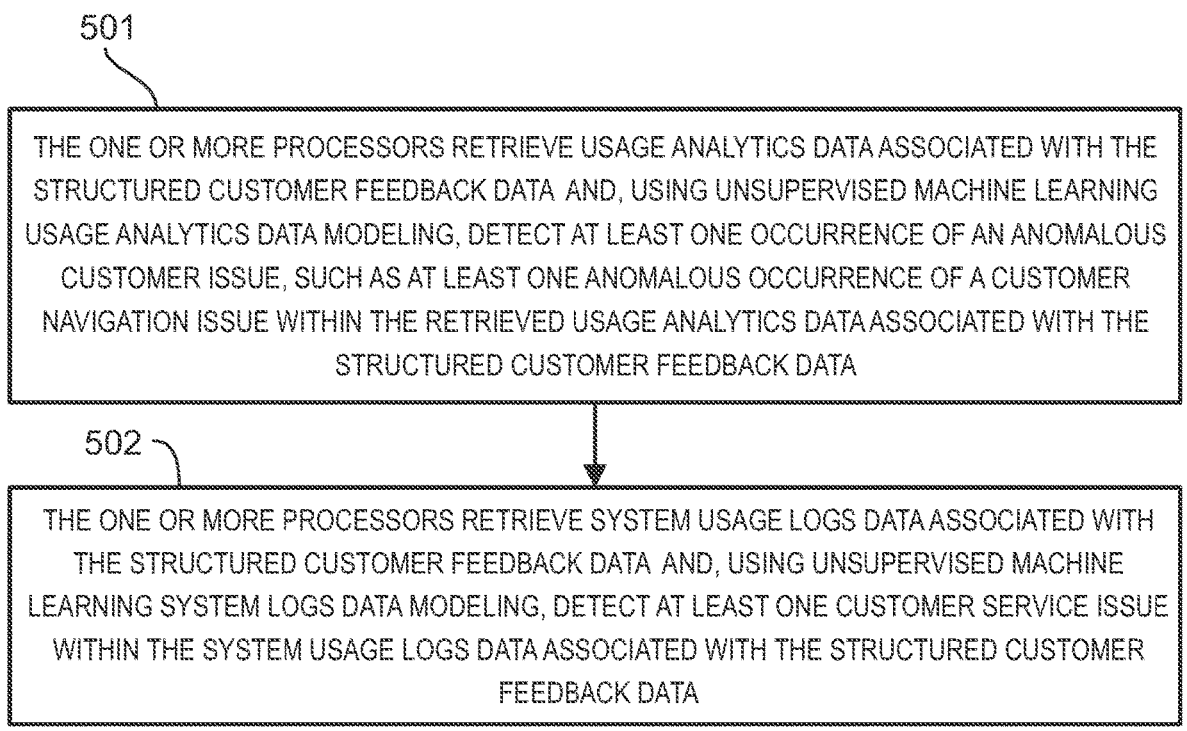
FIG. 5 is a flow chart that illustrates an example of corroborating the identified trending customer issues based on usage analytics data and system logs data according to embodiments of the invention.

FIG. 5 is a flow chart that illustrates an example of corroborating the identified trending customer issues based on usage analytics data and system logs data according to embodiments of the invention. Referring to FIGS. 1 and 5, at 501, the one or more processors of the server 30 may retrieve usage analytics data associated with the structured customer feedback data from one or more usage data analytics processors 14 and, using unsupervised machine learning usage analytics data modeling, may, for example, detect at least one occurrence of an anomalous customer issue, such as at least one anomalous occurrence of a customer navigation issue within the retrieved usage analytics data associated with the structured customer feedback data. Referring further to FIGS. 1 and 5, at 502, the one or more processors of the server 30 may retrieve system logs data associated with the structured customer feedback data from one or more system logs data processors 16 and, using unsupervised machine learning system logs data modeling, may, for example, detect at least one customer service issue within the system usage logs data associated with the structured customer feedback data.

In embodiments according to the invention, the one or more processors of server 30 may enter tickets into the ticketing system 26 and periodically check or poll the ticketing system 26 to determine if issues previously opened in such manner have been resolved. When an issue is determined to be resolved, the one or more processors of server 30 may automatically retrieve data regarding identities of customers whose feedback led to identification of such issues and generate and send messages to such customers notifying them that the issue or issues have been resolved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device to implement the functions/acts specified in the flowchart and/or block diagram block or blocks.

The flowchart and block diagram in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
    a server having one or more processors coupled to memory, said one or more processors being programmed to:
        receive usage analytics and system logs over a predefined period of time from one or more sources of a plurality of different customer feedback data sources;
        receive unstructured customer feedback data over the predefined period of time from the one or more sources of the plurality of different customer feedback data sources;
        generate, using machine learning natural language processing, structured customer feedback data from the unstructured customer feedback data received over the predefined period of time from the plurality of different customer feedback data sources;
        identify, using unsupervised machine learning topic clustering modeling, clusters of semantically similar words within the structured customer feedback data;
        classify, using unsupervised machine learning topic classification modeling, the clusters of semantically similar words into a plurality of categories of customer issues;
        detect, using unsupervised machine learning topic trending modeling, at least one trending customer issue within the plurality of categories of customer issues;
        retrieve a portion of the usage analytics and the system logs that is associated with the structured customer feedback data;
        compare, using unsupervised machine learning usage analytics data modeling, the portion of the usage analytics and the system logs for the predefined period of time with the structured customer feedback data for the predefined period of time to predict a probable customer issue, wherein the probable customer issue is identified in both the structured customer feedback data and the portion of the usage analytics and the system logs for the predefined period of time;
        automatically generate, based on pre-defined thresholds, a metric-driven prioritized list of action items based on a prediction of the probable customer issue; and
        determine, in real time, an appropriate recipient of each service ticket based on an algorithm associated with the one or more processors.

2. The system according to claim 1, wherein the unstructured customer feedback data comprises website customer feedback data, app store customer feedback data, call center transcripts, and live support chat transcripts.

3. The system according to claim 1, said one or more processors being further programmed to:

merge the structured customer feedback data generated from the unstructured customer feedback data received over the predefined period of time from the plurality of different customer feedback data sources.

4. The system according to claim 1, wherein the clusters of semantically similar words identified within the structured customer feedback data comprise clusters of similar customer issue-related words identified within the structured customer feedback data.

5. The system according to claim 1, wherein the plurality of categories of customer issues comprises the plurality of categories of customer issues.

6. The system according to claim 1, said one or more processors being further programmed to:
retrieve system usage logs data associated with the structured customer feedback data; and
detect, using unsupervised machine learning system logs data modeling, at least one customer service issue within the system usage logs data associated with the structured customer feedback data.

7. The system according to claim 1, said one or more processors being further programmed to:
retrieve usage analytics data and system usage logs data associated with the structured customer feedback data; and
corroborate the at least one trending customer issue based upon cross-relating the at least one trending customer issue with at least one of the usage analytics data and the system usage logs data associated with the structured customer feedback data.

8. The system according to claim 7, said one or more processors being further programmed to automatically prioritize the at least one trending customer issue over a plurality of other detected trending customer issues based on corroboration of the detected at least one trending customer issue.

9. The system according to claim 1, wherein the at least one trending customer issue detected within the plurality of categories of customer issues comprises at least one customer problem-related issue detected within the plurality of categories of customer issues.

10. The system according to claim 1, wherein the at least one trending customer issue detected within the plurality of categories of customer issues comprises at least one most frequently occurring customer issue detected within the plurality of categories of customer issues.

11. The system according to claim 10, wherein the at least one trending customer issue detected within the plurality of categories of customer issues comprises the at least one most frequently occurring customer issue associated with a most frequently employed customer usage feature detected within the plurality of categories of customer issues.

12. The system according to claim 1, wherein the at least one trending customer issue detected within the plurality of categories of customer issues comprises at least one customer issue detected within the plurality of categories of customer issues that exceeds an historic baseline for the at least one customer issue.

13. The system according to claim 1, said one or more processors being further programmed to log the at least one trending customer issue into a service ticketing system to generate a logged at least one trending customer issue.

14. The system according to claim 13, said one or more processors being further programmed to automatically track a status of the logged at least one trending customer issue.

15. The system according to claim 13, said one or more processors being further programmed to receive status updates comprising examination and evaluation updates regarding resolution of the logged at least one trending customer issue.

16. The system according to claim 15, said one or more processors being further programmed to mark the logged at least one trending customer issue closed when the logged at least one trending customer issue is resolved.

17. The system according to claim 16, said one or more processors being further programmed to:
upon the resolution of the at least one trending customer issue, automatically retrieve data regarding identities of customers associated with the at least one trending customer issue; and
generate messages notifying the customers associated with the at least one trending customer issue of the resolution of the at least one trending customer issue.

18. A method, comprising:
receiving, by a server having one or more processors coupled to memory, usage analytics and system logs over a predefined period of time from a plurality of different customer feedback data sources;
receiving, by the server, unstructured customer feedback data over the predefined period of time from the plurality of different customer feedback data sources;
generating, by the one or more processors of the server, using machine learning natural language processing, structured customer feedback data from the unstructured customer feedback data received over the predefined period of time from the plurality of different customer feedback data sources;
identifying, by the one or more processors of the server, using unsupervised machine learning topic clustering modeling, clusters of semantically similar words within the structured customer feedback data;
classifying, by the one or more processors of the server, using unsupervised machine learning topic classification modeling, the clusters of semantically similar words into a plurality of categories of customer issues;
detecting, by the one or more processors of the server, using unsupervised machine learning topic trending modeling, at least one trending customer issue within the plurality of categories of customer issues;
retrieving, by the one or more processors of the server, a portion of the usage analytics and the system logs that is associated with the structured customer feedback data;
compare, by the one or more processors of the server, the portion of the usage analytics and the system logs for the predefined period of time with the structured customer feedback data for the predefined period of time to predict a probable customer issue, wherein the probable customer issue is identified in both the structured customer feedback data and the portion of the usage analytics and the system logs for the predefined period of time;
automatically generating, based on a prediction of the probable customer issue; and
determining in real time an appropriate recipient of each service ticket based on an algorithm associated with the one or more processors.

19. The method according to claim 18, further comprising:
retrieving, by the one or more processors of the server, system usage logs data associated with the structured customer feedback data; and
detecting, by the one or more processors of the server, using unsupervised machine learning system logs data modeling, at least one customer service issue within the system usage logs data associated with the structured customer feedback data.

20. The method according to claim 18, further comprising:
retrieving, by the one or more processors of the server, both usage analytics data and system usage logs data associated with the structured customer feedback data; and corroborating, by the one or more processors of the server, the at least one trending customer issue based upon cross-relating the at least one trending customer issue with at least one of usage analytics data and the system usage logs data associated with the structured customer feedback data.

* * * * *